US012795488B2

(12) United States Patent
Naseer-Ul-Islam et al.

(10) Patent No.: US 12,795,488 B2
(45) Date of Patent: Nov. 10, 2026

(54) NETWORK SLICE SPECIFIC CONDITIONAL HANDOVER OPTIMIZATION

(71) Applicant: Nokia Technologies Oy, Espoo (FI)

(72) Inventors: Muhammad Naseer-Ul-Islam, Munich (DE); Irina-Mihaela Balan, Munich (DE); Bernhard Wegmann, Munich (DE)

(73) Assignee: Nokia Technologies Oy, Espoo (FI)

( * ) Notice: Subject to any disclaimer, the term of this patent is extended or adjusted under 35 U.S.C. 154(b) by 407 days.

(21) Appl. No.: 18/572,128

(22) PCT Filed: Jun. 8, 2022

(86) PCT No.: PCT/EP2022/065452
§ 371 (c)(1),
(2) Date: Dec. 19, 2023

(87) PCT Pub. No.: WO2023/285031
PCT Pub. Date: Jan. 19, 2023

(65) Prior Publication Data

US 2024/0292301 A1 Aug. 29, 2024

Related U.S. Application Data

(60) Provisional application No. 63/221,992, filed on Jul. 15, 2021.

(51) Int. Cl.
*H04W 36/14* (2009.01)
*H04W 36/00* (2009.01)

(52) U.S. Cl.
CPC ....... *H04W 36/14* (2013.01); *H04W 36/0085* (2018.08)

(58) Field of Classification Search
None
See application file for complete search history.

(56) References Cited

U.S. PATENT DOCUMENTS

2018/0324663 A1* 11/2018 Park .................. H04W 36/0083
2022/0104300 A1* 3/2022 Ramachandra ...... H04B 7/0695

FOREIGN PATENT DOCUMENTS

EP 4057696 A1 * 9/2022 ............ H04W 76/19
WO 2020/229552 A1 11/2020
WO 2021/088077 A1 5/2021

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

(Continued)

*Primary Examiner* — Diane L Lo

(74) *Attorney, Agent, or Firm* — Robert P. Michal, Esq.; Rimon PC

(57) ABSTRACT

A UE may determine that at least one execution condition for performing handover from a source cell to a target cell is met and the target cell does not support at least one of a network slice or a service the UE requires; based on the determination, store information related to a radio environment associated with the UE; perform handover to the target cell; and transmit the stored information to the target cell after the handover. A target network node may receive the transmitted information; and provide the information to a source network node. The source network node may receive the information; and perform a root cause analysis for the handover execution of the user equipment based, at least partially, on the received information.

1 Claim, 6 Drawing Sheets

(56) References Cited

OTHER PUBLICATIONS

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.
"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.
"3rd Generation Partnership Project; Technical Specification Group Services and System Aspects; System architecture for the 5G System (5GS); Stage 2 (Release 17)", 3GPP TS 23.501, V17.0.0, Mar. 2021, pp. 1-489.
"3rd Generation Partnership Project; Technical Specification Group Core Network and Terminals; Numbering, addressing and identification; (Release 17)", 3GPP TS 23.003, V17.1.0, Mar. 2021, pp. 1-143.
"Msc-generator", Sourceforge, Retrieved on Jan. 9, 2024, Webpage available at : https://sourceforge.net/projects/msc-generator/.
"Report from SON/MDT session", 3GPP TSG-RAN WG2 Meeting #114 electronic, R2-2106476, Agenda: 10.6, CMCC, May 2021, pp. 1-13.
"Handover-related SON aspects", 3GPP TSG-RAN WG2 Meeting #114 electronic, R2-2106025, Agenda: 8.13.2.1, Ericsson, May 19-27, 2021, 16 pages.
International Search Report and Written Opinion received for corresponding Patent Cooperation Treaty Application No. PCT/EP2022/065452, dated Oct. 4, 2022, 19 pages.
"Successful Handover Report for CHO and DAPS", 3GPP TSG-RAN3 #112-e, R3-212250, Agenda: 10.2.1.3, Ericsson, May 17-27, 2021, 5 pages.
"Further considerations on MRO", 3GPP TSG-RAN WG2 Meeting #116 Electronic, R2-2110717, Agenda: 8.13.2.1, Nokia, Nov. 1-12, 2021, 2 pages.

* cited by examiner

NETWORK SLICE SPECIFIC CONDITIONAL HANDOVER OPTIMIZATION

RELATED APPLICATION

This application was originally filed as PCT Application No. PCT/EP2022/065452 on 8 Jun. 2022, which claims priority from U.S. Provisional Application No. 63/221,992, filed on 15 Jul. 2021, each of which is incorporated herein by reference in its entirety.

TECHNICAL FIELD

The example and non-limiting embodiments relate generally to handover and, more particularly, to handover where various network slices are supported in some, but not necessarily all, cells of the network.

BACKGROUND

Network slicing is a feature to support different services using the same underlying mobile network infrastructure. Network slices can differ either in their service requirements like Ultra-Reliable Low Latency Communication (URLLC) and enhanced Mobile Broadband (eMBB) or the tenant that provides those services. A user equipment (UE) may be simultaneously connected and served by one or more network slices. On other hand, a cell may support tens or even hundreds of network slice.

SUMMARY

The following summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: determine that at least one execution condition for performing handover from a source cell to a target cell is met and the target cell does not support at least one of a network slice or a service the apparatus requires; based on the determination, store information related to a radio environment associated with the apparatus; perform handover to the target cell; and transmit the stored information to the target cell after the handover.

In accordance with one aspect, a method comprising: determining that at least one execution condition for performing handover from a source cell to a target cell is met and the target cell does not support at least one of a network slice or a service a user equipment requires; based on the determination, storing information related to a radio environment associated with the user equipment; performing handover to the target cell; and transmitting the stored information to the target cell after the handover.

In accordance with one aspect, an apparatus comprising means for performing: determining that at least one execution condition for performing handover from a source cell to a target cell is met and the target cell does not support at least one of a network slice or a service the apparatus requires; based on the determination, storing information related to a radio environment associated with the apparatus; performing handover to the target cell; and transmitting the stored information to the target cell after the handover.

In accordance with one aspect, a computer-readable medium comprising program instructions stored thereon for causing an apparatus to: determine that at least one execution condition for performing handover from a source cell to a target cell is met and the target cell does not support at least one of a network slice or a service the apparatus requires; based on the determination, store information related to a radio environment associated with the apparatus; perform handover to the target cell; and transmit the stored information to the target cell after the handover.

In accordance with one aspect, an apparatus comprising: at least one processor; and at least one memory including computer program code; the at least one memory and the computer program code configured to, with the at least one processor, cause the apparatus at least to: receive, from a user equipment, information related to a radio environment associated with a handover execution of the user equipment from a source network node to the apparatus, wherein the information indicates that the apparatus does not support at least one of a network slice or service the user equipment requires; and provide the information to the source network node.

In accordance with one aspect, a method comprising: receiving, from a user equipment, information related to a radio environment associated with a handover execution of the user equipment from a source network node to a target network node, wherein the information indicates that the target network node does not support at least one of a network slice or service the user equipment requires; and providing the information to the source network node.

In accordance with one aspect, an apparatus comprising means for performing: receiving, from a user equipment, information related to a radio environment associated with a handover execution of the user equipment from a source network node to the apparatus, wherein the information indicates that the apparatus does not support at least one of a network slice or service the user equipment requires; and providing the information to the source network node.

In accordance with one aspect, a computer-readable medium comprising program instructions stored thereon for causing an apparatus to perform: receiving, from a user equipment, information related to a radio environment associated with a handover execution of the user equipment from a source network node to the apparatus, wherein the information indicates that the apparatus does not support at least one of a network slice or service the user equipment requires; and providing the information to the source network node.

In accordance with one aspect, an apparatus comprising: at least one processor; and at least one memory including computer program code; the at least one memory and the computer program code configured to, with the at least one processor, cause the apparatus at least to: receive, from a network node, information related to a radio environment associated with a handover execution of a user equipment from the apparatus to the network node, wherein the information indicates that the network node does not support at least one of a network slice or service the user equipment requires; and perform a root cause analysis for the handover execution of the user equipment based, at least partially, on the received information.

In accordance with one aspect, a method comprising: receiving, from a network node, information related to a radio environment associated with a handover execution of a user equipment from a source network node to the network node, wherein the information indicates that the network node does not support at least one of a network slice or service the user equipment requires; and performing a root cause analysis for the handover execution of the user equipment based, at least partially, on the received information.

In accordance with one aspect, an apparatus comprising means for performing: receiving, from a network node, information related to a radio environment associated with a handover execution of a user equipment from the apparatus to the network node, wherein the information indicates that the network node does not support at least one of a network slice or service the user equipment requires; and performing a root cause analysis for the handover execution of the user equipment based, at least partially, on the received information.

In accordance with one aspect, a computer-readable medium comprising program instructions stored thereon for causing an apparatus to perform: receiving, from a network node, information related to a radio environment associated with a handover execution of a user equipment from the apparatus to the network node, wherein the information indicates that the network node does not support at least one of a network slice or service the user equipment requires; and performing a root cause analysis for the handover execution of the user equipment based, at least partially, on the received information.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
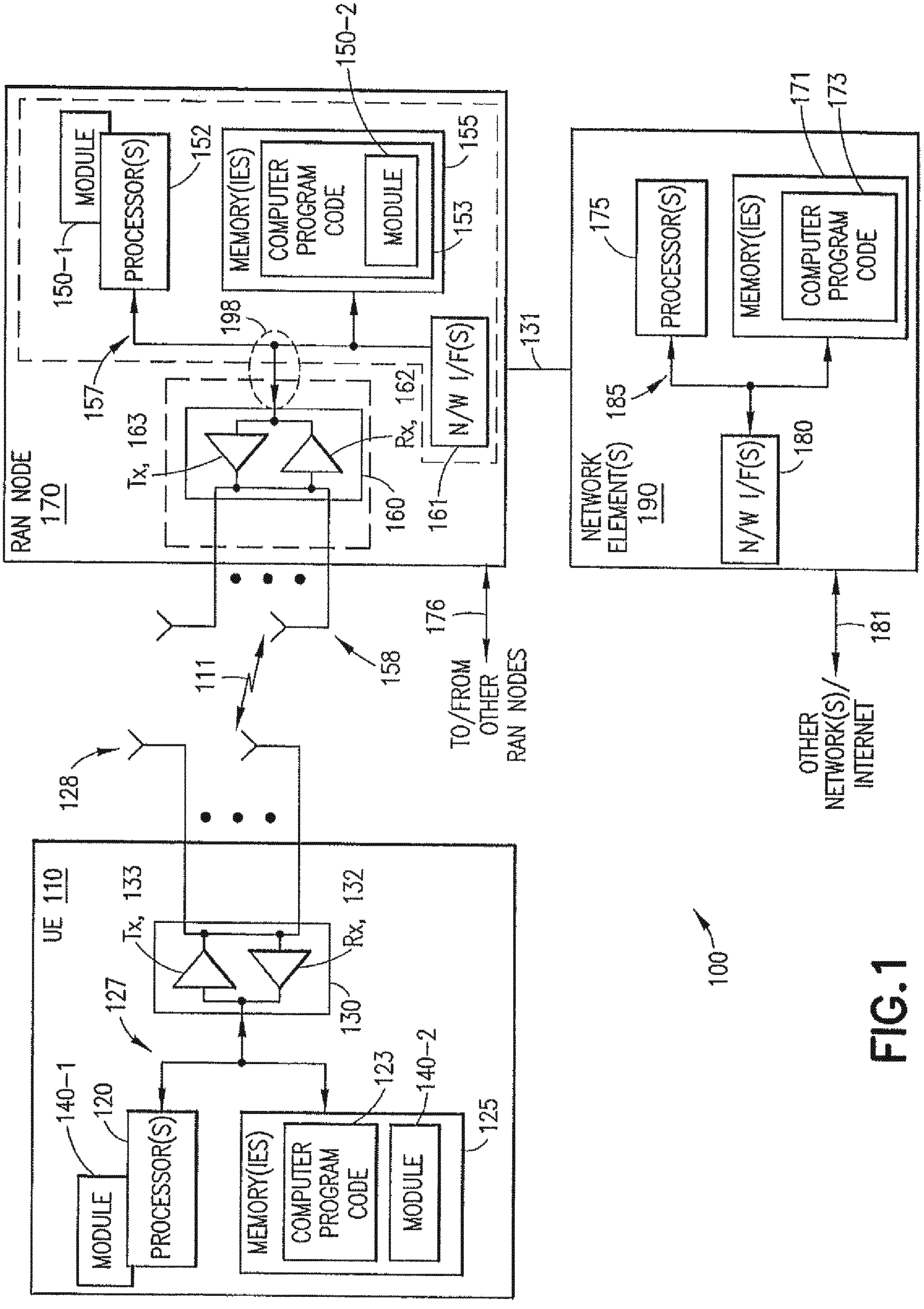
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
CGI cell global identity
CHO conditional handover
CIO cell individual offset
CU central unit
DU distributed unit
eMBB enhanced mobile broadband
eNB evolved Node B (e.g., an LTE base station)
EN-DC E-UTRA-NR dual connectivity
En-gNB node providing NR user plane and control plane protocol terminations towards the UE, and acting as secondary node in EN-DC
E-UTRA evolved universal terrestrial radio access, i.e., the LTE radio access technology
HO handover
HOF handover failure
gNB base station for 5G/NR, i.e., a node providing NR user plane and control plane protocol terminations towards the UE, and connected via the NG interface to the 5GC
I/F interface
KPI key performance indicator
L1 layer 1
LTE long term evolution
MAC medium access control
MME mobility management entity
MNO mobile network operator
MRO mobility robustness optimization
NG new generation
NG-eNB new generation eNB
NR new radio
NSSAI network slice selection assistance information
N/W or NW network
PDCP packet data convergence protocol
PHY physical layer
PM performance counter
PRACH physical random access channel
QoE quality of experience
RACH random access channel
RAN radio access network
RF radio frequency
RLC radio link control
RLF radio link failure
RRC radio resource control
RRH remote radio head
RS reference signal
RU radio unit
Rx receiver
SD slice differentiator
SDAP service data adaptation protocol
SGW serving gateway
SHR successful HO report
SMF session management function
SN secondary node
SST slice service type
Tx transmitter
UE user equipment
UPF user plane function
URLLC ultra-reliable low-latency communication Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a NG-eNB. A gNB is a node providing NR user plane and control plane protocol terminations towards the UE, and connected via the NG interface to a 5GC (such as, for example, the network element(s) 190). The NG-eNB is a node providing E-UTRA user plane and control plane protocol terminations towards the UE, and connected via the NG interface to the 5GC. The NG-RAN node may include multiple gNBs, which may also include a central unit (CU) (gNB-CU) and one or more distributed unit(s) (DUs) (gNB-DUs). Note that the DU may include or be coupled to and control a radio unit (RU). The gNB-CU is a logical node hosting RRC, SDAP and PDCP protocols of the gNB or RRC and PDCP protocols of the EN-gNB that controls the operation of one or more gNB-DUs. The gNB-CU terminates the F1 interface connected with the gNB-DU. The reference 198 illustrates a link between remote elements of the RAN node 170 and centralized elements of the RAN node 170. The gNB-DU is a logical node hosting RLC, MAC and PHY layers of the gNB or EN-gNB, and its operation is partly controlled by gNB-CU. One gNB-CU supports one or multiple cells. One cell is supported by only one gNB-DU. The gNB-DU terminates the F1 interface connected with the gNB-CU. Note that the DU and/or the CU may include a structure shown for RAN-node 170. For example, the DU may include the transceiver 160, e.g., as part of a RU, but some examples of this may have the transceiver 160 as part of a separate RU, e.g., under control of and connected to the DU. The RAN node 170 may also be an evolved NodeB (eNB) base station, for long term evolution (LTE), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN node 170 may include a CU and one or more DUs. The CU may include the processor(s) 152, memories 155, and network interfaces 161. The DU may also contain its own memory/memories and processor(s), and/or other hardware.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU and the CU, or be implemented solely in the DU.

The one or more network interfaces 161 communicate over a network such as via the links 176 and 131. Two or more RAN nodes 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) for LTE or a distributed unit (DU) for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

As described with reference to the example in FIG. 1, an apparatus (e.g., user equipment, or a network node) for performing embodiments of the present disclosure may be implemented in hardware, or as any suitable combination of hardware and software. For example, the apparatus may include a computer program code or portions of it executed by at least one processor. As an example, the computer program code or portions of the code may be in a source code form, object code form, or in some intermediate form, and it may be stored in some sort of distribution medium, or computer readable medium (e.g., memory 125, 155 or 171). The computer readable medium may be a non-transitory medium. The computer readable memories 125, 155, and 171 in FIG. 1 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. The user equipment 110 may also include a mobile terminal (MT) part in an integrated access and backhaul (IAB) node, a vehicle-mounted wireless terminal devices, wireless endpoints, mobile stations, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

Features as described herein generally relate to network slicing. Network slicing is a feature to support different services using the same underlying mobile network infrastructure. Network slices may differ either in their service requirements, like Ultra-Reliable Low Latency Communication (URLLC) and enhanced Mobile Broadband (eMBB), or the tenant that provides those services.

A network slice may be uniquely identified with the Single-Network Slice Selection Assistance Information (S-NSSAI). A UE may be simultaneously connected and served by one or more (e.g., at most eight) S-NSSAIs. Alternatively, a cell may support tens or even hundreds of S-NSSAIs. For example, a tracking area may support up to 1024 network slices.

The S-NSSAI may include both Slice Service Type (SST) and Slice Differentiator (SD) fields with a total length of 32 bits (e.g. 8 bit SST field and 24 bit SD field). In another example, the S-NSSAI may include only SST field part, in which case the length of S-NSSAI may only be 8 bits. Other formats for S-NSSAI are possible; these examples are non-limiting. The S-NSSAI may be considered an example of a slice identifier; other identifiers of a network slice may be possible.

The SST field may have standardized and non-standardized values. For example, values 0 to 127 may belong to the standardized SST range. For example, an SST value of 1 may indicate that the slice is suitable for handling of 5G eIBB, 2 may indicate that the slice is suitable for handling of URLLC, etc. SD may be operator-defined only.

Features as described herein generally relate to conditional handover (CHO). CHO is designed to separate the handover (HO) preparation and execution phases. CHO can be prepared in advance, for example while the UE is still in good coverage conditions of the source cell. After successful CHO preparation, the UE is provided with CHO execution conditions that define when the UE should (autonomously) execute the CHO, based on the prepared target cell measurements in comparison to the radio measurements of the source cell (e.g. signal strength, quality measurements, etc.). The UE may be configured with a CHO command containing the target cell configuration and a condition to execute the handover for one or multiple target cells. The condition may be based on radio measurements. When the UE evaluates the CHO condition and determines that the condition holds/is met for a specific target cell, the UE may apply the CHO command and initiate the random access procedure to the target cell. The UE may be configured with multiple conditions for multiple target cells.

In example embodiments of the present disclosure, there may be one source cell and multiple target cells. The multiple target cells may include detectable neighbor cells. The source/serving cell may be served by a source/serving node, i.e. a network node that is serving the source cell of the UE. The one or more target cells may respectively be served by one or more target nodes, i.e. a network node(s) serving the target cell of the UE.

In an example of conditional handover for intra-NR the UE may perform radio measurement(s) and transmit a measurement report to a source node. The source node may make a CHO decision based on the measurement report. Based on this CHO decision, the source node may transmit a CHO request to one or more target nodes, which may perform admission control. The one or more target nodes may transmit a CHO request acknowledge message to the source node, which may transmit a RRC reconfiguration message to the UE. The UE may evaluate one or more CHO conditions for the one or more target nodes, and may determine that one or more CHO conditions are met for the target node. Based on that determination, the UE may stop transmission/reception to/from the source node and may transmit a PRACH preamble to the target node for which the CHO condition was met. The target node may respond with a RACH response, and the UE may transmit a RRC reconfiguration complete message to the target node, which may transmit a handover success message to the source node. The source node may transmit a SN status transfer message to the target node and perform data forwarding. The source node may transmit a CHO cancel message to one or more target nodes with which the UE has not determined to perform handover. This message may serve to release CHO preparation.

As part of the Xn setup or update procedures between neighboring gNBs, the gNBs may exchange their list of supported network slices. With this information, the source cell may be aware of the network slice support of the potential target cells when initiating a HO request.

As UEs may be connected to multiple slices, the source cell may still initiate a HO to a target cell that does not support all the connected slices of the UE, in order to minimize service interruption for the slices that are supported by the target cell. For better admission control and resource assignment at the target cell, the source cell may also provide the list of network slices currently used by the outgoing UE as part of the HO request message to target cells.

A "Successful HO Report (SHR)" may be sent by the UE to the target cell. This report may be sent after a successful HO. If the SHR is triggered only when there was some radio problem/issue observed between the HO preparation and execution, the SHR can only indicate the radio related problems during a successful HO.

Figure 2:
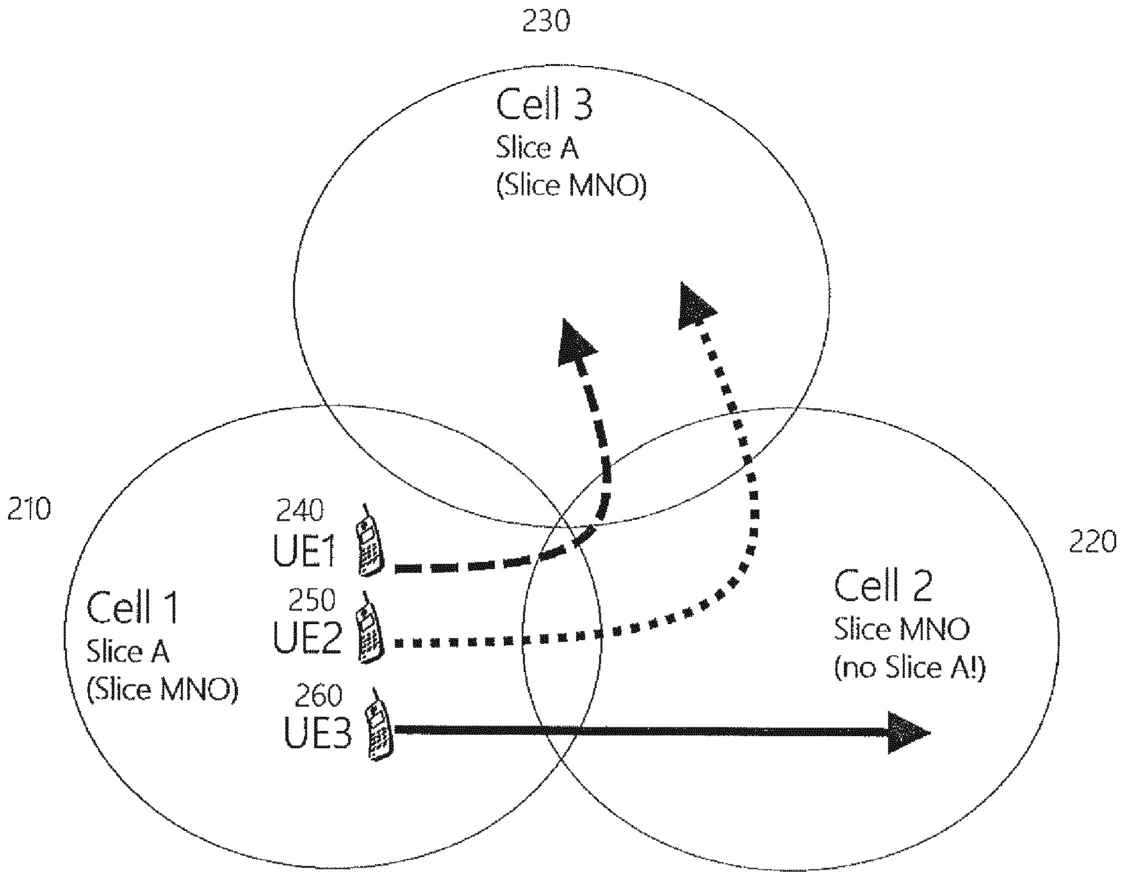
FIG. 2 is a diagram illustrating features as described herein.

In some scenarios, the network slice deployment may have limited coverage area support, where some of the potential target cells may not support the required slices of an outgoing UE, as shown in FIG. 2. In the example of FIG. 2, UE1 (240), UE2 (250) and UE3 (260) are connected to Slice A in Cell 1 (210). Cell 1 (210) also support Slice MNO. Cell 2 (220) supports Slice MNO, but not Slice A. Cell 3 (230) supports Slice A and Slice MNO. Other network slice deployment scenarios are possible; this example is not limiting.

In the example of FIG. 2, that Cell 2 (220) does not support Slice A may be a restriction that results from a slice tenant that wants slice/service to be supported only in certain areas. Such limited coverage area support for slices may lead to problems in relation to UE mobility. For example, discrepancies may appear between the actual radio coverage boundary and the desired network slice geographical boundary. This may happen due to errors in the planning phase, or due to dynamic changes in radio coverage due to environmental issues. In another example, UE mobility patterns may not fully match the planned and actual radio coverage and slice border definition, for example, due to a mismatch between the planned and actual radio coverage, or wrong assumptions about UE mobility patterns. In each of these examples, the planning phase cannot fully avoid the example problems, as the actual radio coverage and mobility patterns may only be observed after the actual deployment and activation of the network slices.

Referring now to FIG. 2, all three UEs may move towards the border of Cell 1 (210). In the example, UE1 (240) appears to move towards Cell 2 (220) and then sharply towards Cell 3 (230); UE2 (250) appears to move towards Cell 2 (220) and then gradually towards Cell 3 (230); and UE3 (260) appears to move towards Cell 2 (220). As the source cell (i.e. Cell 1 (210)) is not aware of the actual mobility pattern of the UEs (240, 250, 260), it can potentially prepare both Cell 2 (220) and Cell 3 (230) as potential target cells for CHO. As the UEs are connected to Slice A, Cell 2 (220) may not be optimal for the UEs, as it does not support Slice A. HOs to Cell 2 (220) for such UEs may mean service interruption, leading to bad quality of experience (QoE).

To avoid such non-optimal HO, the source cell (210) may decide to not prepare Cell 2 (220) for handover, and/or may decide to prioritize Cell 3 (230) HO by defining a larger HO offset, e.g., a larger cell individual offset (CIO) for Cell 2 (220), as Cell 1 (210) may already know the slice support for both neighboring cells. However, this may not be optimal; for example, for UE2 (250) and UE3 (260) these decisions/actions may result in Radio Link Failures (RLFs) related to late HO. These RLFs may be detected by mobility robustness optimization (MRO) solutions, and they may result in re-adjustment of the CIOs, which may then negatively affect the UE1 (240) and other UEs with similar mobility pattern on this cell border. Moreover, if the UEs are also connected to Slice MNO, the RLFs may also negatively affect the Slice MNO service; the source cell (210) may not totally omit Cell 2 (220) from CHO target preparation without consequences.

In other words, the network (source cell) may not make an optimal decision for target cell selection based only on the static network slice support information of the neighboring cells. Stated another way, a decision made by the source cell based only on the static network slice support information of the neighboring cells may prove to be suboptimal, meaning that a better/more efficient target cell selection was possible. In an example, no target cell may have a 100% match for the UE requirements, since not all slices are supported in a cell like Cell 2 (220), and then in this case it may not be possible for the network to make an optimal decision for target cell selection. In another example, a target cell matching 100% of the UE requirements may not be 100% compatible with the UE's trajectory (e.g. UE2 (250) and UE3 (260)), and in this case, the network cannot make an optimal decision for target cell selection either.

In addition, for CHO target preparation, the radio conditions at the time of HO preparation and HO execution may be very different due to the delay between the two stages, and the source cell may not know the exact mobility pattern of the UEs beforehand.

In some scenarios, the UE may not be aware of the slice support of neighboring cells, and may have to rely on the CHO configuration (prepared cells and execution conditions) received from the source cell. As a result, even at CHO execution phase, the UEs connected to Slice A may not try to select Cell 3 (230), as the CHO execution may totally depend on the execution condition(s) provided by the source cell (210). In other words, the CHO condition(s) monitored by the UE might not include a condition that the target cell support a slice to which the UE is connected. The execution condition may be based on the radio measurements only, and the UE may only decode the HO command after the fulfilment of the execution condition. As a result, the UE may be aware of which PDU sessions/Slices can potentially continue in the selected target cell only after reading the HO command. Once the execution condition is met for a particular target cells, the UE may then directly try to connect to that target cell and may not make further decisions based on the contents of the HO command. Therefore, also at CHO execution phase, the UE may not make any prioritization of potential target cells based on the required slices of the UE.

In the discussed example scenario(s), the HOs may be successfully performed (i.e. no RLFs or HOFs are detected); the experienced problem may only be a service/slice interruption observed at the service layer. Since the problem is not detected as a radio caused mobility issue, such cases may not be detected with HO related key performance indicators (KPIs)/counters, and therefore these problems may not be solved by taking the a priori (static) slice support information of different neighboring cells into account. In an example embodiment of the present disclosure, additional information from the UEs may be provided by UEs that experience problematic mobility events to the network.

Example embodiments of the present disclosure may be configured to provide information to enable enhancement of the mobility robustness optimization (MRO) procedures which may ensure CHO optimization in order to minimize the service interruption that may happen due to non-optimal selection of target cells, for example where some target do not support the required slices but other target cells do support the required slices.

In an example embodiment, MRO may be enhanced, and slice-specific CHO may be enhanced or optimized, for identification of the service interruption problems during UE mobility. In an example embodiment, means for network reconfigurations may be employed to minimize service interruption problems after the deployment of different network slices.

In an example embodiment, mobility related service/slice problems may be stored (e.g., logged) and reported by user equipment. In an example embodiment, root cause analysis may be performed by the network (e.g. source gNB). In an example embodiment, optimization/re-configuration may be performed by the network based on received information on the mobility related service/slice problems from the user equipment.

In an example embodiment, the radio environment at the time of CHO execution may be stored (e.g., logged) by user equipment when there is some service/slice interruption expected with this CHO execution. Some example embodiments of the present disclosure may assist in analysis of the actual radio conditions of prepared target cells by providing additional information for the analysis.

In an example embodiment, example measurements stored, e.g., in a "CHO Execution Environment" report, may include one or more of: slice/service dropped (i.e. service interruption after cell change), potentially also including identifiers (e.g., the S-NSSAIs) of the dropped slices; leaving cell (i.e., last serving cell, or source cell) ID (e.g., CGI); target cell ID (e.g., CGI); measurements of source cell; measurements of detectable neighboring cells at execution; UE identifier (e.g., C-RNTI); mobility information which may be conveyed by the source cell to the UE with HO preparation; etc.

In an example embodiment, measurements may be stored as part of the Successful HO Report (SHR). In an example embodiment, a new trigger for the SHR may be defined, such as some slice/service discontinuity observed at HO execution. That is, even if no radio issues/problems detected during a successful HO procedure, a SHR may still be sent by UE if slice/service discontinuity occurs due to the successful HO. In an example embodiment, a new trigger condition may be defined if SHR is also used for the slice/service related problem reporting during successful HOs. In an alternative example embodiment, measurements may be stored and included in a newly defined report, for example, a CHO Execution Environment Report. A new report may be defined, while the SHR may be limited to indicating radio related problems only. In other words, if the SHR does not contain measurements logged/stored in response to some slice/service discontinuity observed at HO execution, a different/separate report may be used to contain measurements stored in response to some slice/service discontinuity observed at HO execution. It may be noted that such a different/separate report may have some other name, for example a quality of service update report; the name of the report is not limiting.

Figure 3:
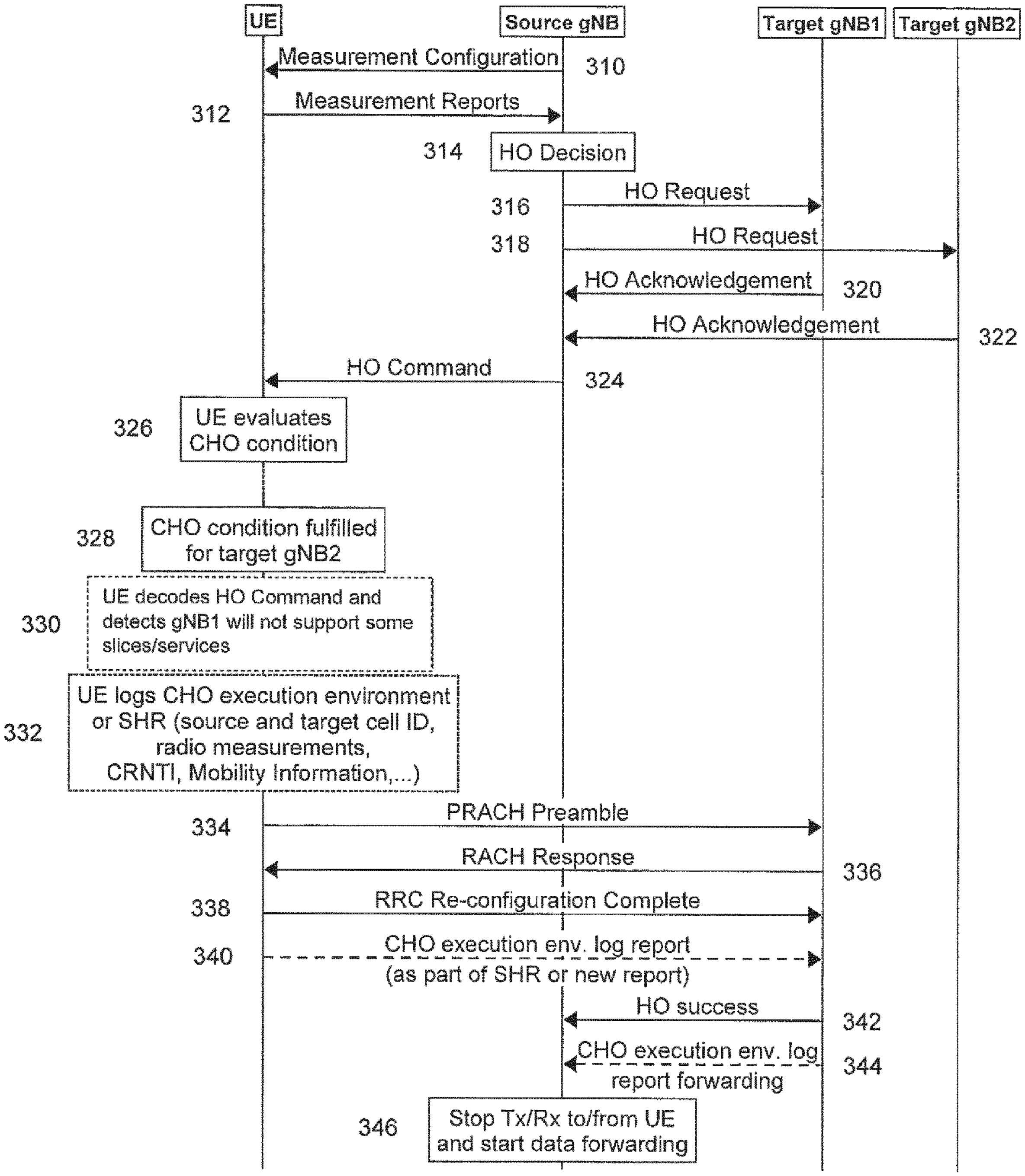
FIG. 3 is a diagram illustrating features as described herein.

In an example embodiment, if the CHO execution is successful, then the UE may report this CHO Execution Environment report to the selected target cell, which is now the serving cell for the UE (due to successful HO). The selected target cell may then forward this report to the original/previous source cell for further analysis. Referring now to FIG. 3, illustrated is an example of the process of UE storing and reporting of slice/service problems during mobility.

At 310, the source gNB may transmit to the UE a measurement configuration message. At 312, the UE may transmit to the source gNB one or more measurement reports. These measurement reports may be based on the measurement configuration message. For example, in the scenario shown in FIG. 2, UE2 (250) and UE3 (260) may report strong Cell2 (220) radio measurements and weak Cell3 (230) radio measurements, which may indicate that Cell2 (220) was the right/optimal/best matching choice to be a target cell, as otherwise the UE might have experienced an RLF that would degrade the performance even for slices that are supported by Cell2 (220) (e.g. Slice MNO). As another example, UE1 (240) in FIG. 2 may report relatively similar radio measurements for both Cell2 (220) and Cell3 (230), which may indicate that it could be possible to prioritize Cell3 (230) for such UEs (e.g. UEs with a movement pattern similar to UE1 (240)) to avoid the potential service interruption for Slice A.

At 314, the source gNB may make a HO decision. At 316, the source gNB may transmit to the target gNB1 a HO request message. At 318, the source gNB may transmit to the target gNB2 a HO request message. At 320, the target gNB1 may transmit to the source gNB an HO acknowledgement message. At 322, the target gNB2 may transmit to the source gNB an HO acknowledgment message. At 324, the source gNB may transmit to the UE an HO command. At 326, the UE may evaluate the CHO condition(s) indicated in the HO command. At 328, the UE may determine/detect that a CHO condition(s) has been fulfilled, for example for target gNB1. At 330, the UE may decode the HO command and may detect that gNB1 will not support some slices/services. At 332, the UE may store information related to a radio environment of the UE, e.g., in a CHO execution environment report or SHR. The stored information may include at least one of source cell ID, target cell ID, radio measurements, CRNTI (or other identifier of the UE), mobility information, etc. At 334, the UE may transmit to the target gNB1 a PRACH preamble. At 336, the target gNB1 may transmit to the UE a RACH response. At 338, the UE may transmit to the target gNB1 an RRC Re-configuration complete message. At 340, the UE may provide the information related to the radio environment to the target gNB1, e.g., in a CHO execution environment log report or a SHR. In an example, the UE may transmit a report including the information related to the radio environment available to the network. For example, an RRC Configuration Complete message may contain a flag configured to indicate whether the information/report is available. A network node or device may determine, based on the flag, that the information is available, and may be able to access/fetch the information. The UE may transmit the information to the network node based on a request from the network node. This report may include cause information that indicates why the report was provided/made available. For example, the report may indicate that the target network node does not support one or more slices/services. This may be explicitly indicated in the report, or implicitly indicated by including radio measurements in the report. Other information, such as identifier(s) of the UE, source gNB, and/or the target gNB, may be included in the report as well. At 342, the target gNB1 may transmit to the source gNB an HO success message. At 344, the target gNB1 may transmit to the source gNB the (fetched) CHO execution environment log report or the SHR. This may comprise fetching and/or forwarding of the report received from/made available by the UE as part of inter-node communication. The target gNB1 may or may not decode the report. In an example embodiment, the target gNB1 may decode the report to identify a cause for the report and/or a source node to which the report may be forwarded. Additionally or alternatively, the HO success message transmitted by the target gNB1 may include the CHO execution environment log report or the SHR (including the information related to the radio environment), and transmission of the information in a separate step at 344 may be optional. At 346, the source gNB may stop transmission/reception to/from the UE, and may start data forwarding.

It may be noted that, in the foregoing, one or more steps may be performed simultaneously, and/or one or more steps may be performed in a different order. Additionally or alternatively, some steps (e.g., steps 318, 322) may be optional, and/or additional steps may be performed. The foregoing examples are not limiting.

In an example embodiment, the UE may only store information associated with the execution environment at the time an execution condition for CHO is met when at least one execution condition is met and the UE determines/detects that the gNB for which the at least one execution condition is met does not support a network slice or service required by the UE. In other words, if the execution condition for CHO is not met, or if the gNB for which at least one execution condition for CHO is met supports the network slice(s) and/or service(s) required by the UE, then the UE may not store the information associated with the execution environment. The problem with the network slice or service may be a problem that network slice/service interruption occurs due to successful handover.

In an example embodiment, the stored information associated with the execution environment at the time an execution condition for CHO is met may include latest measurements available at that time. Earlier measurements may not be included in the stored information transmitted to the target gNB. In other words, if more than one measurement for, e.g. the target cell is available when an execution condition is determined to be met, the newest measurement, used for evaluating that the execution condition is met, may be selected for inclusion in the stored information to be transmitted to the target network node.

In an example embodiment, the transmitted measurement report (e.g. successful HO report) may include one or more information elements that may indicate a network slice problem and/or measurements made by the UE. In an example embodiment, the transmitted measurement report may include an indication that one or more slices and/or services have experienced interruption due to successful HO. For example, the report may include a list of identifiers of a set of interrupted slices.

In an example embodiment, the UE may transmit the stored information associated with the execution environment at the time an execution condition for CHO is met (i.e. execution phase) after handover has been successfully completed. The information may not be transmitted to the target gNB before or during handover.

In an example embodiment, based on the received information, the network (e.g. source gNB) may perform root cause analysis. This may be considered an instance of running/performing MRO. The network may not be able to detect/rectify the problem of slice/service dropping on its own, and may need to rely on the measurement reports stored by the UE, as described above. Based on the collection/statistics of UE reports related to CHO execution environment, new slice-specific and cell pair specific performance counters (PM) may be defined/collected. In an example embodiment, a slice-specific coverage hole and/or service outage performance counter may be defined/collected to indicate whether a slice-compliant cell (e.g. Cell3 (230)) with reasonable signal strength is observed within reported neighbor cell measurements in UE's reported CHO execution environment report(s)/SHR(s). In other words, based on the observed radio measurements included in received reports, the network may be able to determine whether there is a slice-specific coverage hole and/or service outage. If no slice-compliant cell with reasonable signal strength is observed within reported neighbor cell measurements, or in other words, if signal strength of neighboring slice-compliant cells are below certain threshold, the network may determine that there is a slice-specific coverage hole and/or service outage. If at least one slice-compliant neighbor cell is determined to have a signal strength above the threshold, there may not be a slice-specific coverage hole and/or service outage. In an example embodiment a potential wrong cell handover (WCH) performance counter may be defined/collected to indicate whether a slice-compliant cell (for example Cell3 (230)) with a signal strength in the comparable range of the selected target cell (for example Cell2 (220)) is observed in UE's reported CHO execution environment reports. For example, if the received information indicates that a difference in signal strength between a slice-compliant cell and the target cell served by network node is below a threshold, the network may determine that a wrong HO was executed. In other words, based on the observed radio measurements included in received reports, the network may be able to determine that a cell better matching the requirements of the UE was available but not chosen during CHO.

In an example embodiment, KPIs (e.g., slice-specific coverage hole, wrong cell handover, etc.) may be collected in absolute terms (exact number of UEs for each case), or in percentage terms.

In an example embodiment, the network may perform optimization/re-configuration based on the received information, and/or based on a root cause analysis derived from the information. Once the network (source cell) has collected enough statistics (e.g. KPIs), it may evaluate the mobility performance and try to re-configure the network.

In an example embodiment, if multiple UE reports indicate a potential wrong cell HO (e.g. UEs with a mobility pattern only like UE1 (440)), this may indicate that there was always a second-best candidate target cell with all slices available. In an example embodiment, the network (source cell) may decide to re-adjustment the HO configuration parameters, for example, Cell Individual Offsets (CIOs) to prioritize the slice supporting cell (e.g. best candidate) over other potential target cells.

In an example embodiment, if the UE reports mostly indicate a Slice-specific coverage hole/service outage problem, as defined above (e.g. UEs mostly with mobility patterns like UE2 (450) and/or UE3 (460)), this may indicate some errors in the planning process. For example, the actual geographical border indicated by slice tenant as the slice border may not match with the radio coverage border of the slice. Alternatively, the mobility patterns of the UEs associated with the slices may not have been correctly predicted in the planning phase. To rectify those planning errors after the deployment of network slice, in an example embodiment, the network (source cell) may decide to send an alarm to slice-management/orchestration layer. The alarm may indicate a potential slice coverage hole. In an example embodiment, the slice-management/orchestration layer may then (also) decide to activate Slice A in Cell 2 (420). This may have the effect of removing the slice coverage hole.

Figure 4:
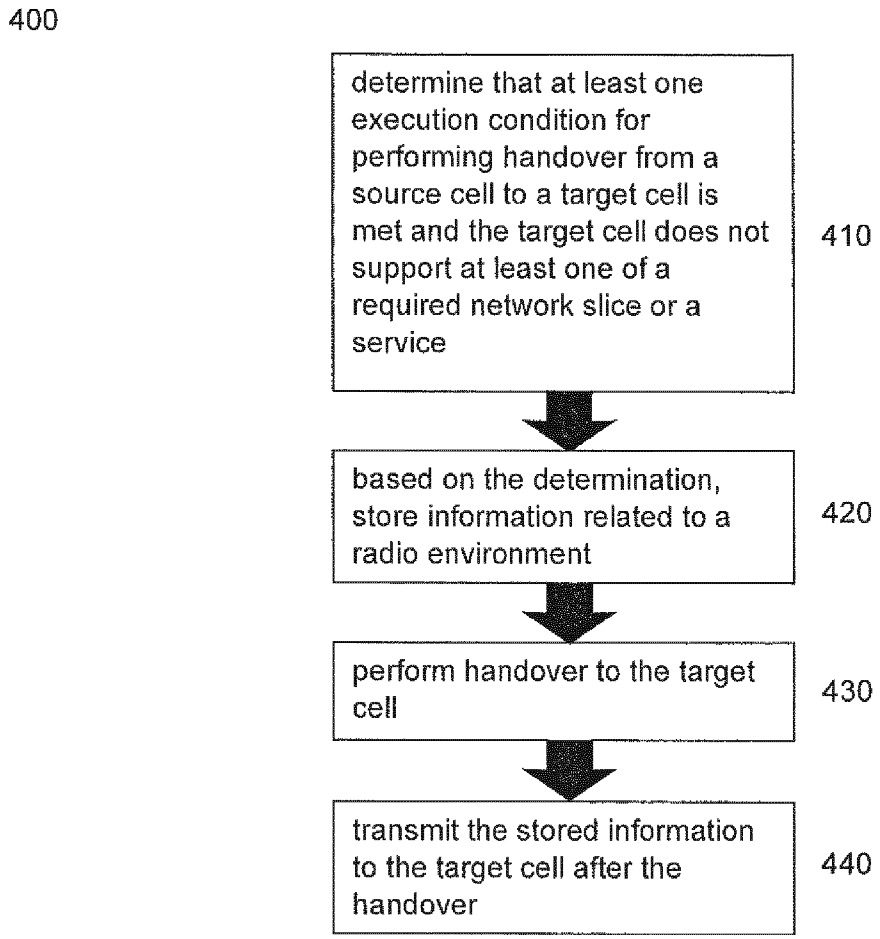
FIG. 4 is a flowchart illustrating steps as described herein.

FIG. 4 illustrates the potential steps of an example method 400. The example method 400 may include: determine at 410 that at least one execution condition for performing handover from a source cell to a target cell is met and the target cell does not support at least one of a required network slice or a service; at 420, based on the determination, store information related to a radio environment; perform handover to the target cell at 430; and transmit the stored information to the target cell after the handover at 440. For example, the example method 400 may be performed by a user equipment, e.g., UE 110 in FIG. 1, UE 240, 250 or 260 in FIG. 2. For example, the at least one of a required network slice or a service may be at least one of a network slice or a service required by the user equipment. For example, the information related to the radio environment may be information related to a radio environment associated with the user equipment. In some embodiments, the radio environment may include measurements available at the user equipment when the execution condition of the handover is met.

Figure 5:
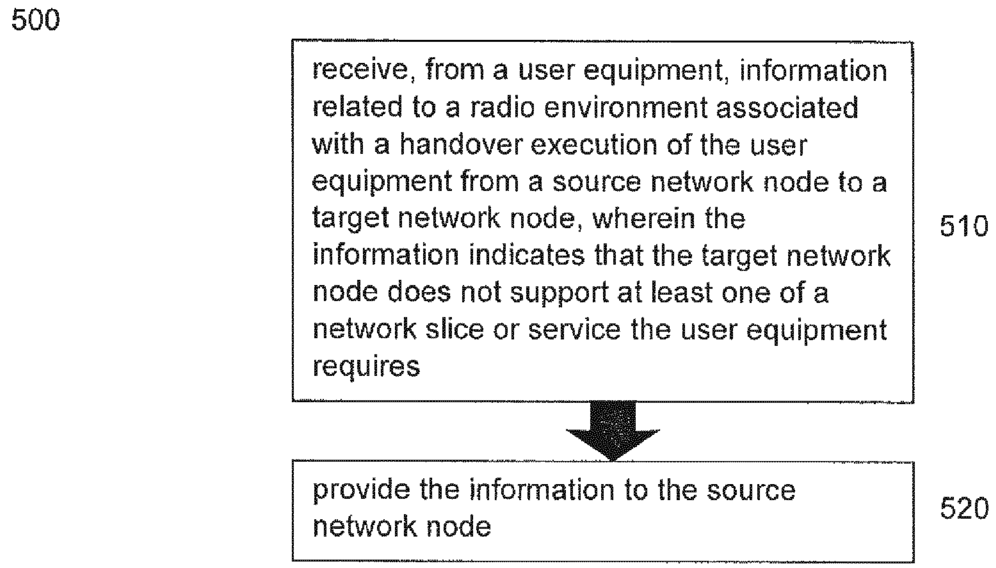
FIG. 5 is a flowchart illustrating steps as described herein.

FIG. 5 illustrates the potential steps of an example method 500. The example method 500 may include: receive at 510, from a user equipment, information related to a radio environment associated with a handover execution of the user equipment from a source network node to a target network node, wherein the information indicates that the target network node does not support at least one of a network slice or service the user equipment requires; and provide the information to the source network node (e.g., a network node serving cell 1 in FIG. 2) at 520. The example method 500 may be performed by the target network node, e.g., a network node serving cell 2 or 3 in FIG. 2.

Figure 6:
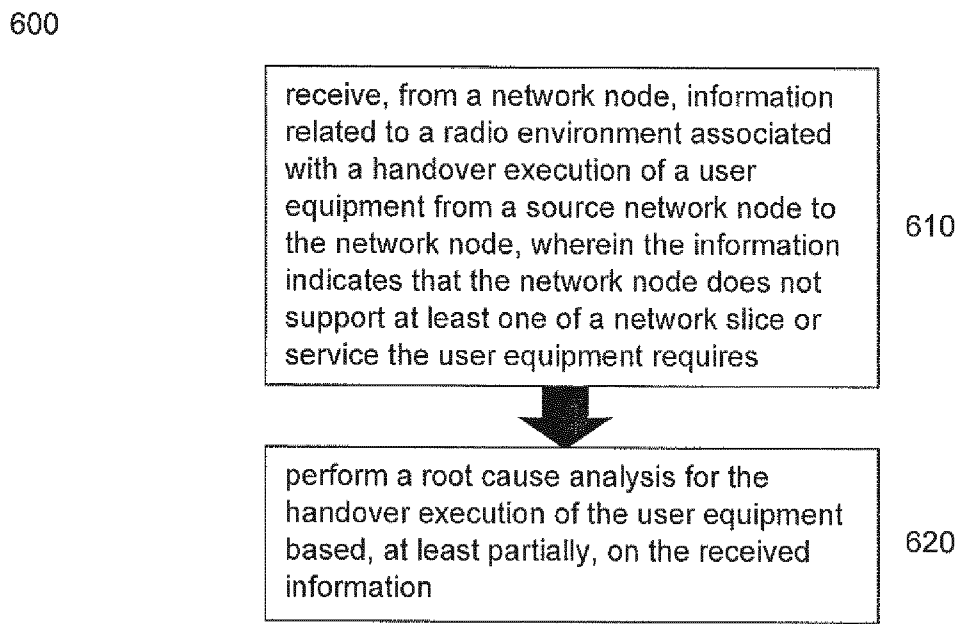
FIG. 6 is a flowchart illustrating steps as described herein.

FIG. 6 illustrates the potential steps of an example method 600. The example method 600 may include: receive at 610, from a network node (e.g., a network node serving cell 2 or 3 in FIG. 2), information related to a radio environment associated with a handover execution of a user equipment (e.g., UE 240, 250 or 260 in FIG. 2) from a source network node (e.g., a network node serving cell 1 in FIG. 2) to the network node, wherein the information indicates that the network node does not support at least one of a network slice or service the user equipment requires; and perform a root cause analysis for the handover execution of the user equipment based, at least partially, on the received information at 620. The example method 600 may be performed by the source network node (e.g., a network node serving cell 1 in FIG. 2). The source network node and/or the target network node may be implemented with a structure of RAN node 170 in FIG. 1.

A technical effect of example embodiments of the present disclosure may be that they may work on principles similar to those of MRO, i.e. to observe the mobility statistics, to identify the root cause of different problems, and then re-configure the network. A technical effect of example embodiments of the present disclosure may be to rectify the slice planning errors by removing any gaps in the planned geographical coverage area of the slice and the actual radio coverage of the slice. A technical effect of example embodiments of the present disclosure may be to adjust the cell mobility parameters to minimize mobility events where the UE is handed over to a target cell that does not support required slices, but there still exists a second best target cell that does support the slice, and is also comparable to the first target cell in terms of radio measurements. A technical effect of example embodiments of the present disclosure may be to minimize service interruption for network slices during UE mobility and improve the overall quality of experience of the UEs associated with those slices.

In accordance with one example embodiment, an apparatus may comprise: at least one processor; and at least one memory including computer program code; the at least one memory and the computer program code configured to, with the at least one processor, cause the apparatus at least to perform: determine that at least one execution condition for performing handover from a source cell (e.g., cell 1 in FIG. 2) to a target cell (e.g., cell 2 in FIG. 2) is met and the target cell does not support at least one of a network slice or a service the apparatus requires; based on the determination, store information related to a radio environment associated with the apparatus; perform handover to the target cell; and transmit the stored information to the target cell after the handover. The apparatus may include a user equipment, e.g., UE 110 in FIG. 1, UE 240, 250 or 260 in FIG. 2

The stored information may comprise at least one of: an indication that the target cell does not support the network slice, an indication that the handover results in an interruption of the service, an identifier of an interrupted or dropped network slice or service, at least one radio measurement of the source cell, at least one radio measurement of at least one neighboring cell (e.g., the target cell and/or one or more other neighbor cells), an identifier of the apparatus (e.g., a C-RNTI), or mobility information associated with handover preparation.

The stored information related to the radio environment may comprise: a latest measurement result for at least one of the source cell or one or more neighbor cells available at the apparatus when the at least one execution condition is met.

Transmitting the stored information may comprise transmitting the stored information as part of a successful handover report. In this example, the successful handover report may be triggered by the slice/service interruption after handover, i.e., the target cell (which is also the new serving cell of the user equipment after the handover) does not support at least one of a network slice or a service the apparatus requires.

Transmitting the stored information may comprise transmitting the stored information in a report separate from the SHR, e.g., as part of a conditional handover execution environment report.

In accordance with one aspect, an example method may be provided comprising: determining, with a user equipment, that at least one execution condition for performing handover from a source cell (e.g., cell 1 in FIG. 2) to a target cell (e.g., cell 2 in FIG. 2) is met and the target cell does not support at least one of a network slice or a service the user equipment requires; based on the determination, storing information related to a radio environment associated with the user equipment; performing handover to the target cell;

and transmitting the stored information to the target cell (which is a new serving cell of the user equipment) after the handover. The method may be performed by a user equipment, e.g., UE 110 in FIG. 1 or UE 240, 250 or 260 in FIG. 2.

The stored information may comprise at least one of: an indication that the target cell does not support the network slice, an indication that the handover results in an interruption of the service, an identifier of an interrupted or dropped network slice or service, at least one radio measurement of the source cell, at least one radio measurement of at least one neighboring cell (e.g., the target cell, and/or one or more other neighbor cells), an identifier of the user equipment (e.g., a C-RNTI), or mobility information associated with handover preparation. In some embodiments, the stored information related to the radio environment may comprise: a latest measurement result for at least one of the source cell or one or more neighbor cells available at the user equipment when the at least one execution condition is met.

Transmitting the stored information may comprise transmitting the stored information as part of a successful handover report, and/or as part of a conditional handover execution environment report.

In accordance with one example embodiment, an apparatus may comprise: circuitry configured to perform: determine that at least one execution condition for performing handover from a source cell to a target cell is met and the target cell does not support at least one of a network slice or a service the apparatus requires; based on the determination, store information related to a radio environment associated with the apparatus; perform handover to the target cell; and transmit the stored information to the target cell after the handover.

In accordance with one example embodiment, an apparatus may comprise: processing circuitry; memory circuitry including computer program code, the memory circuitry and the computer program code configured to, with the processing circuitry, cause the apparatus to: determine that at least one execution condition for performing handover from a source cell to a target cell is met and the target cell does not support at least one of a network slice or a service the apparatus requires; based on the determination, store information related to a radio environment associated with the apparatus; perform handover to the target cell; and transmit the stored information to the target cell after the handover.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining that at least one execution condition for performing handover from a source cell to a target cell is met and the target cell does not support at least one of a network slice or a service the apparatus requires; based on the determination, storing information related to a radio environment associated with the apparatus; performing handover to the target cell; and transmitting the stored information to the target cell after the handover. In some embodiments, the means may comprise at least one processor and at least one memory. In some embodiments, the apparatus may be implemented in or as a user equipment.

The stored information may comprise at least one of: an indication that the target cell does not support the network slice, an indication that the handover results in an interruption of the service, an identifier of an interrupted or dropped network slice or service, at least one radio measurement of the source cell, at least one radio measurement of at least one neighboring cell, an identifier of the apparatus, or mobility information associated with handover preparation. In some embodiments, the stored information related to the radio environment may comprise: a latest measurement result for at least one of the source cell or one or more neighbor cells available at the apparatus when the at least one execution condition is met.

The means configured to perform transmitting the stored information may comprise means configured to perform transmitting the stored information as part of a successful handover report. Alternatively or additionally, the means configured to perform transmitting the stored information may comprise means configured to perform transmitting the stored information as part of a conditional handover execution environment report.

In accordance with one example embodiment, a computer-readable medium comprising program instructions stored thereon for causing an apparatus to: determine that at least one execution condition for performing handover from a source cell to a target cell is met and the target cell does not support at least one of a network slice or a service the apparatus requires; based on the determination, store information related to a radio environment associated with the apparatus; perform handover to the target cell; and transmit the stored information to the target cell after the handover.

The stored information may comprise at least one of: an indication that the target cell does not support the network slice, an indication that the handover results in an interruption of the service, an identifier of an interrupted or dropped network slice or service, at least one radio measurement of the source cell, at least one radio measurement of at least one neighboring cell, an identifier of the apparatus, or mobility information associated with handover preparation. In some embodiments, the stored information related to the radio environment may comprise: a latest measurement result for at least one of the source cell or one or more neighbor cells available at the apparatus when the at least one execution condition is met.

Transmitting the stored information may comprise transmitting the stored information as part of a successful handover report. Alternatively or additionally, transmitting the stored information may comprise transmitting the stored information as part of a conditional handover execution environment report.

In accordance with another example embodiment, a program storage device readable by a machine may be provided, tangibly embodying a program of instructions executable by the machine for performing operations, the operations comprising: determine that at least one execution condition for performing handover from a source cell to a target cell is met and the target cell does not support at least one of a network slice or a service a user equipment requires; based on the determination, store information related to a radio environment associated with the user equipment; perform handover to the target cell; and transmit the stored information to the target cell after the handover.

In accordance with one example embodiment, an apparatus may comprise: at least one processor; and at least one memory including computer program code; the at least one memory and the computer program code configured to, with the at least one processor, cause the apparatus at least to perform: receive, from a user equipment, information related to a radio environment associated with a handover execution of the user equipment from a source network node to the apparatus, wherein the information may indicate that the apparatus does not support at least one of a network slice or service the user equipment requires; and provide the information to the source network node. The apparatus may be a network node serving a target cell of the handover, which becomes the new serving network node of the UE after the handover.

The information may comprise at least one of: an indication that the apparatus does not support the network slice, an indication that the handover results in an interruption of the service, an identifier of an interrupted or dropped network slice or service, at least one radio measurement of a source cell the source network node serves, at least one radio measurement of at least one neighboring cell, an identifier of the user equipment, or mobility information associated with handover preparation. In some embodiments, the information may comprise a latest measurement result for at least one of the source cell or one or more neighbor cells available at the user equipment when the at least one execution condition is met.

Receiving the information may comprise receiving the information as part of a successful handover report.

Receiving the information may comprise receiving the information as part of a conditional handover execution environment report.

In accordance with one aspect, an example method may be provided comprising: receiving, from a user equipment, information related to a radio environment associated with a handover execution of the user equipment from a source network node to a target network node, wherein the information may indicate that the target network node does not support at least one of a network slice or service the user equipment requires; and providing the information to the source network node. The method may be performed by the target network node, which is also the serving network node of the UE after the handover.

The information may comprise at least one of: an indication that the target network node does not support the network slice, an indication that the handover results in an interruption of the service, an identifier of an interrupted or dropped network slice or service, at least one radio measurement of a source cell the source network node serves, at least one radio measurement of at least one neighboring cell, an identifier of the user equipment, or mobility information associated with handover preparation.

Receiving the information may comprise receiving the information as part of a successful handover report.

Receiving the information may comprise receiving the information as part of a conditional handover execution environment report.

In accordance with one example embodiment, an apparatus may comprise: circuitry configured to perform: receive, from a user equipment, information related to a radio environment associated with a handover execution of the user equipment from a source network node to the apparatus, wherein the information may indicate that the apparatus does not support at least one of a network slice or service the user equipment requires; and provide the information to the source network node. The apparatus may be implemented in or as a network node serving a target cell of the handover, which becomes the new serving network node of the UE after the handover.

In accordance with one example embodiment, an apparatus may comprise: processing circuitry; memory circuitry including computer program code, the memory circuitry and the computer program code configured to, with the processing circuitry, cause the apparatus to: receive, from a user equipment, information related to a radio environment associated with a handover execution of the user equipment from a source network node to the apparatus, wherein the information may indicate that the apparatus does not support at least one of a network slice or service the user equipment requires; and provide the information to the source network node.

In accordance with one example embodiment, an apparatus may comprise means for performing: receiving, from a user equipment, information related to a radio environment associated with a handover execution of the user equipment from a source network node to the apparatus, wherein the information may indicate that the apparatus does not support at least one of a network slice or service the user equipment requires; and providing the information to the source network node. In some embodiments, the means may comprise at least one processor and at least one memory.

The information may comprise at least one of: an indication that the apparatus does not support the network slice, an indication that the handover results in an interruption of the service, an identifier of an interrupted or dropped network slice or service, at least one radio measurement of a source cell the source network node serves, at least one radio measurement of at least one neighboring cell, an identifier of the user equipment, or mobility information associated with handover preparation. In some embodiments, the information may comprise a latest measurement result for at least one of the source cell or one or more neighbor cells available at the user equipment when the at least one execution condition is met.

Receiving the information may comprise receiving the information as part of a successful handover report.

Receiving the information may comprise receiving the information as part of a conditional handover execution environment report.

In accordance with one example embodiment, a computer-readable medium comprising program instructions stored thereon for causing an apparatus to perform: receiving, from a user equipment, information related to a radio environment associated with a handover execution of the user equipment from a source network node to the apparatus, wherein the information may indicate that the apparatus does not support at least one of a network slice or service the user equipment requires; and providing the information to the source network node.

The information may comprise at least one of: an indication that the apparatus does not support the network slice, an indication that the handover results in an interruption of the service, an identifier of an interrupted or dropped network slice or service, at least one radio measurement of a source cell the source network node serves, at least one radio measurement of at least one neighboring cell, an identifier of the user equipment, or mobility information associated with handover preparation.

Receiving the information may comprise receiving the information as part of a successful handover report.

Receiving the information may comprise receiving the information as part of a conditional handover execution environment report.

In accordance with another example embodiment, a program storage device readable by a machine may be provided, tangibly embodying a program of instructions executable by the machine for performing operations, the operations comprising: receive, from a user equipment, information related to a radio environment associated with a handover execution of the user equipment from a source network node to a target network node, wherein the information may indicate that the target network node does not support at least one of a network slice or service the user equipment requires; and provide the information to the source network node.

In accordance with one example embodiment, an apparatus may comprise: at least one processor; and at least one memory including computer program code; the at least one memory and the computer program code configured to, with the at least one processor, cause the apparatus at least to perform: receive, from a network node, information related to a radio environment associated with a handover execution of a user equipment from the apparatus to the network node, wherein the information may indicate that the network node does not support at least one of a network slice or service the user equipment requires; and perform a root cause analysis for the handover execution of the user equipment based, at least partially, on the received information. The apparatus may be a source network node of the handover for the user equipment.

The example apparatus may be further configured to, when performing the root cause analysis, at least to: determine, based on the received information, at least one of: whether there is a slice-specific coverage hole, whether there is a service outage, or whether a wrong cell handover was executed.

The example apparatus may be further configured to: cause reconfiguration of a network based on the determination.

The example apparatus may be further configured to, when determining, to: determine that there is the slice-specific coverage hole or the service outage, where the received information may indicate that signal strength of neighboring slice-compliant cells is below a threshold.

The example apparatus may be further configured to, when causing reconfiguration, at least to: indicate, to a slice-management layer, the slice-specific coverage hole or the service outage.

The example apparatus may be further configured to, when determining, to: determine that the wrong cell handover was executed, where the received information may indicate that a difference in signal strength between a slice-compliant cell and a target cell the network node serves is below a threshold.

The example apparatus may be further configured to, when causing reconfiguration, at least to: cause re-adjustment of one or more handover configurations, wherein the re-adjustment may be configured to prioritize a cell supporting the network slice or service the user equipment requires.

The information may comprise at least one of: an indication that the network node does not support the network slice, an indication that the handover results in an interruption of the service, an identifier of an interrupted or dropped network slice or service, at least one radio measurement of a cell the apparatus serves, at least one radio measurement of at least one neighboring cell, an identifier of the user equipment, or mobility information associated with handover preparation. In some embodiments, the information may comprise a latest measurement result for at least one of the source cell or one or more neighbor cells available at the user equipment when the at least one execution condition is met.

In accordance with one aspect, an example method may be provided comprising: receiving, from a network node, information related to a radio environment associated with a handover execution of a user equipment from a source network node to the network node, wherein the information may indicate that the network node does not support at least one of a network slice or service the user equipment requires; and performing a root cause analysis for the handover execution of the user equipment based, at least partially, on the received information.

Performing the root cause analysis may comprise, at least, determining, based on the received information, at least one of: whether there is a slice-specific coverage hole, whether there is a service outage, or whether a wrong cell handover was executed.

The example method may further comprise: causing reconfiguration of a network based on the determination.

The determining may further comprise: determining that there is the slice-specific coverage hole or the service outage, where the received information may indicate that signal strength of neighboring slice-compliant cells is below a threshold.

The causing of the reconfiguration may comprise: indicating, to a slice-management layer, the slice-specific coverage hole or the service outage.

The determining may comprise: determining that the wrong cell handover was executed, where the received information may indicate that a difference in signal strength between a slice-compliant cell and a target cell the network node serves is below a threshold.

The causing of the reconfiguration may comprise: causing re-adjustment of one or more handover configurations, wherein the re-adjustment may be configured to prioritize a cell supporting the network slice or service the user equipment requires.

The information may comprise at least one of: an indication that the network node does not support the network slice, an indication that the handover results in an interruption of the service, an identifier of an interrupted or dropped network slice or service, at least one radio measurement of a cell the source network node serves, at least one radio measurement of at least one neighboring cell, an identifier of the user equipment, or mobility information associated with handover preparation.

In accordance with one example embodiment, an apparatus may comprise: circuitry configured to perform: receive, from a network node, information related to a radio environment associated with a handover execution of a user equipment from the apparatus to the network node, wherein the information may indicate that the network node does not support at least one of a network slice or service the user equipment requires; and perform a root cause analysis for the handover execution of the user equipment based, at least partially, on the received information.

In accordance with one example embodiment, an apparatus may comprise: processing circuitry; memory circuitry including computer program code, the memory circuitry and the computer program code configured to, with the processing circuitry, cause the apparatus to: receive, from a network node, information related to a radio environment associated with a handover execution of a user equipment from the apparatus to the network node, wherein the information may indicate that the network node does not support at least one of a network slice or service the user equipment requires; and perform a root cause analysis for the handover execution of the user equipment based, at least partially, on the received information.

In accordance with one example embodiment, an apparatus may comprise means for performing: receiving, from a network node, information related to a radio environment associated with a handover execution of a user equipment from the apparatus to the network node, wherein the information may indicate that the network node does not support at least one of a network slice or service the user equipment requires; and performing a root cause analysis for the handover execution of the user equipment based, at least partially, on the received information.

The means configured to perform the root cause analysis may comprise means configured to perform: determining, based on the received information, at least one of: whether there is a slice-specific coverage hole, whether there is a service outage, or whether a wrong cell handover was executed.

The means may be further configured to perform: causing reconfiguration of a network based on the determination.

The means configured to perform the determining may comprise means configured to perform: determining that there is the slice-specific coverage hole or the service outage, where the received information may indicate that signal strength of neighboring slice-compliant cells is below a threshold.

The means configured to perform causing reconfiguration may comprise means configured to perform: indicate, to a slice-management layer, the slice-specific coverage hole or the service outage.

The means configured to perform determining may comprise means configured to perform: determining that the wrong cell handover was executed, where the received information indicates that a difference in signal strength between a slice-compliant cell and a target cell the network node serves is below a threshold.

The means configured to perform causing reconfiguration may comprise means configured to perform: causing re-adjustment of one or more handover configurations, wherein the re-adjustment may be configured to prioritize a cell supporting the network slice or service the user equipment requires.

The information may comprise at least one of: an indication that the network node does not support the network slice, an indication that the handover results in an interruption of the service, an identifier of an interrupted or dropped network slice or service, at least one radio measurement of a cell the apparatus serves, at least one radio measurement of at least one neighboring cell, an identifier of the user equipment, or mobility information associated with handover preparation.

In accordance with one example embodiment, a computer-readable medium comprising program instructions stored thereon for causing an apparatus to perform: receiving, from a network node, information related to a radio environment associated with a handover execution of a user equipment from the apparatus to the network node, wherein the information may indicate that the network node does not support at least one of a network slice or service the user equipment requires; and performing a root cause analysis for the handover execution of the user equipment based, at least partially, on the received information.

The example computer-readable medium may be further configured to cause the apparatus, when performing the root cause analysis, at least to: determine, based on the received information, at least one of: whether there is a slice-specific coverage hole, whether there is a service outage, or whether a wrong cell handover was executed.

The example computer-readable medium may be further configured to cause the apparatus to: cause reconfiguration of a network based on the determination.

The example computer-readable medium may be further configured to cause the apparatus, when determining, to: determine that there is the slice-specific coverage hole or the service outage, where the received information may indicate that signal strength of neighboring slice-compliant cells is below a threshold.

The example computer-readable medium may be further configured to cause the apparatus, when causing reconfiguration, at least to: indicate, to a slice-management layer, the slice-specific coverage hole or the service outage.

The example computer-readable medium may be further configured to cause the apparatus, when determining, to: determine that the wrong cell handover was executed, where the received information indicates that a difference in signal strength between a slice-compliant cell and a target cell the network node serves is below a threshold.

The example computer-readable medium may be further configured to cause the apparatus, when causing reconfiguration, at least to: cause re-adjustment of one or more handover configurations, wherein the re-adjustment may be configured to prioritize a cell supporting the network slice or service the user equipment requires.

The information may comprise at least one of: an indication that the network node does not support the network slice, an indication that the handover results in an interruption of the service, an identifier of an interrupted or dropped network slice or service, at least one radio measurement of a cell the source network node serves, at least one radio measurement of at least one neighboring cell, an identifier of the user equipment, or mobility information associated with handover preparation.

In accordance with another example embodiment, a program storage device readable by a machine may be provided, tangibly embodying a program of instructions executable by the machine for performing operations, the operations comprising: receive, from a network node, information related to a radio environment associated with a handover execution of a user equipment from a source network node to the network node, wherein the information may indicate that the network node does not support at least one of a network slice or service the user equipment requires; and perform a root cause analysis for the handover execution of the user equipment based, at least partially, on the received information.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one memory including computer program code;

the at least one memory and the computer program code configured to, with the at least one processor, cause the apparatus at least to:

determine that at least one execution condition for performing handover from a source cell to a target cell is met and the target cell does not support at least one of a network slice or a service the apparatus requires;

based on the determination, store information related to a radio environment associated with the apparatus;

perform handover to the target cell; and transmit the stored information to the target cell after the handover;

wherein the stored information comprises:

an indication that the target cell does not support the network slice, an indication that the handover results in an interruption of the service, an identifier of an interrupted or dropped network slice or service, at least one radio measurement of the source cell, at least one radio measurement of at least one neighboring cell, an identifier of the apparatus, and mobility information associated with handover preparation;

wherein the stored information related to the radio environment comprises a latest measurement result for at least one of the source cell or one or more neighbor cells available at the apparatus when the at least one execution condition is met, and wherein transmitting the stored information comprises transmitting the stored information as part of at least one of a successful handover report or a conditional handover execution environment report; and wherein transmitting the stored information to the target cell comprises:

indicating, in a radio resource control configuration complete message to the target cell, that the stored information is available; and transmitting the stored information to the target cell based on a request from the target cell.

* * * * *